(12) United States Patent
Newman et al.

(10) Patent No.: US 9,614,780 B2
(45) Date of Patent: Apr. 4, 2017

(54) PREDICTIVE DELAYCAST FEEDBACK

(71) Applicant: ViaSat Inc., Carlsbad, CA (US)

(72) Inventors: Daniel M. Newman, Littleton, MA (US); Mark D. Dankberg, Encinitas, CA (US); James Coggins, Chelmsford, MA (US); Steven R. Hart, Carlsbad, CA (US)

(73) Assignee: ViaSat Inc., Carlsbad, CA (US)

( * ) Notice: Subject to any disclaimer, the term of this patent is extended or adjusted under 35 U.S.C. 154(b) by 0 days.

(21) Appl. No.: 15/209,507

(22) Filed: Jul. 13, 2016

(65) Prior Publication Data

US 2016/0323196 A1   Nov. 3, 2016

Related U.S. Application Data

(63) Continuation of application No. 14/195,673, filed on Mar. 3, 2014, now Pat. No. 9,407,556.

(51) Int. Cl.
*H04L 12/54* (2013.01)
*H04L 12/925* (2013.01)
*H04L 12/801* (2013.01)
*H04L 29/06* (2006.01)

(52) U.S. Cl.
CPC ............ *H04L 47/722* (2013.01); *H04L 47/19* (2013.01); *H04L 65/4076* (2013.01); *H04L 65/4084* (2013.01)

(58) Field of Classification Search
CPC ... H04L 49/90; H04L 49/9005; H04L 12/861; H04L 47/6275; H04L 12/865
USPC .................. 370/412–418, 429, 440
See application file for complete search history.

(56) References Cited

U.S. PATENT DOCUMENTS

| | | | | |
|---|---|---|---|---|
| 6,738,379 B1* | 5/2004 | Balazinski | ............. | H04L 29/06 370/394 |
| 6,744,762 B1* | 6/2004 | Hojo | ....................... | H04L 47/10 370/392 |
| 6,970,921 B1* | 11/2005 | Wang | .................. | H04L 12/5693 709/218 |
| 2007/0019547 A1* | 1/2007 | Ho | ...................... | H04L 12/6418 370/230 |
| 2009/0109844 A1* | 4/2009 | Lee | ..................... | H04L 12/5693 370/230 |

* cited by examiner

*Primary Examiner* — Mang Yeung
(74) *Attorney, Agent, or Firm* — Marsh Fischmann & Breyfogle LLP; Daniel J. Sherwinter

(57) ABSTRACT

Systems and methods are described for predictive delaycast feedback in relation to content object queuing and offer and request handling via communications systems. When a subscriber of communications and/or media services requests access to a content object, embodiments can determine where the content object can and/or should be placed in a delaycast queue. The queue can include multiple regions associated with different estimated delivery timeframes. The placement determination can involve determining an appropriate queue location for the requested content object (e.g., an appropriate queue region), and determining an associated promise time for the requested object.

25 Claims, 6 Drawing Sheets

PREDICTIVE DELAYCAST FEEDBACK

FIELD

Embodiments relate generally to communications systems, and, more particularly, to content object queuing and offer and request handling via communications systems.

BACKGROUND

Users of communications services are increasingly accessing media content over data communications networks, like the Internet, through content service providers (e.g., media aggregator websites), web portals, games, and/or other user interfaces. Even television interfaces commonly include interactive electronic program guide interfaces that can facilitate access to linear, on-demand, and locally-stored media content. Media content providers can use these interfaces and various marketing and incentive techniques to help users find and access desirable content, thereby increasing profitability, advertising opportunities, etc.

This increasing demand for media content also yields an increased demand for bandwidth resources of the underlying communications infrastructures. In some cases, communications service providers attempt to combat ever-increasing demands on their networks through increased prices, resource throttling, limitations on service offerings, etc. However, it can be preferable in other cases to better utilize available resources to satisfy the increasing demands.

BRIEF SUMMARY

Among other things, systems and methods are described for predictive delaycast feedback in relation to content object queuing and offer and request handling via communications systems. When a subscriber of communications and/or media services requests access to a content object, embodiments can determine whether the request can and/or should be placed in a delaycast queue (e.g., a shared queue of requested objects scheduled for delivery over shared link resources). The queue can include multiple regions associated with different estimated delivery timeframes. For example, one queue region can be a "watch now" region for requests that can be fulfilled substantially in real time, while one or more other queue regions can be "watch later" regions for time-shifted request fulfillment. The placement determination can involve determining an appropriate queue location for the requested content object (e.g., an appropriate queue region), and determining an associated promise time for the requested object.

According to one set of embodiments, a provider-side system is provided in a communications infrastructure. The system includes: a communications processor that operates to receive a delayable content request from a requesting subscriber-side system for delivery of a content object over the communications infrastructure; a queue having a number of previously requested content objects in a priority order arranged at least according to first and second queue regions, at least some of the queued content objects having associated promise times, the first queue region corresponding to a first timeframe so that content objects queued in the first queue region are promised for delivery over the communications infrastructure within the first timeframe, and the second queue region corresponding to a second timeframe so that content objects queued in the second queue region are promised for delivery over the communications infrastructure within the second timeframe, the second timeframe being longer than the first timeframe; and a queue processor. The queue processor operates to: determine a proposed queue depth of the requested content object to be in the first queue region when the requested content object is deliverable within the first timeframe; determine the proposed queue depth of the requested content object to be in the second queue region when the requested content object is not deliverable within the first timeframe and the requested content object is deliverable within the second timeframe; and queue the requested content object at a position in the first or second queue region according to the proposed queue depth.

According to another set of embodiments, a method is provided. The method includes: receiving a delayable content request by a provider-side system of a communications infrastructure for a content object; determining, by the provider-side system, a proposed queue depth of the requested content object with respect to a queue, the queue having a number of previously requested content objects, at least some of the queued content objects having associated promise times. The queued content objects are arranged in a priority order at least according to: a first queue region corresponding to a first timeframe so that content objects queued in the first queue region are promised for delivery over the communications infrastructure within the first timeframe; and a second queue region corresponding to a second timeframe so that content objects queued in the second queue region are promised for delivery over the communications infrastructure within the second timeframe, the second timeframe being longer than the first timeframe. The proposed queue depth is determined to be in the first queue region of the queue when the requested content object is deliverable within the first timeframe, and the proposed queue depth is determined to be in the second queue region of the queue when the requested content object is not deliverable within the first timeframe and the requested content object is deliverable within the second timeframe. The method further includes queuing, by the provider-side system, the requested content object in the queue according to the proposed queue depth.

According to another set of embodiments, another method is provided. The method includes: receiving a delayable content request by a provider-side system of a communications infrastructure for a content object; determining a present watch now region of a queue, the queue having a watch now region and a watch later region, the watch now region being dynamically sized according to presently available channel capacity; determining whether the requested content object is deliverable as a watch nowable object if placed at the end of the watch now region of the queue; determining, when the requested content object is not deliverable as a watch nowable object if placed at the end of the watch now region of the queue, a queue depth in the watch later region of the queue for which queuing the requested object at the determined queue depth violates fewer than a predetermined threshold of promise times associated with presently queued content objects; and queuing the requested content object in the watch now region of the queue when the requested content object is determined to be deliverable as a watch nowable object if placed at the end of the watch now region of the queue; and queuing the requested content object at the determined queue depth when the requested content object is not queued in the watch now region of the queue.

BRIEF DESCRIPTION OF THE DRAWINGS

The present disclosure is described in conjunction with the appended figures.

Figure 1:
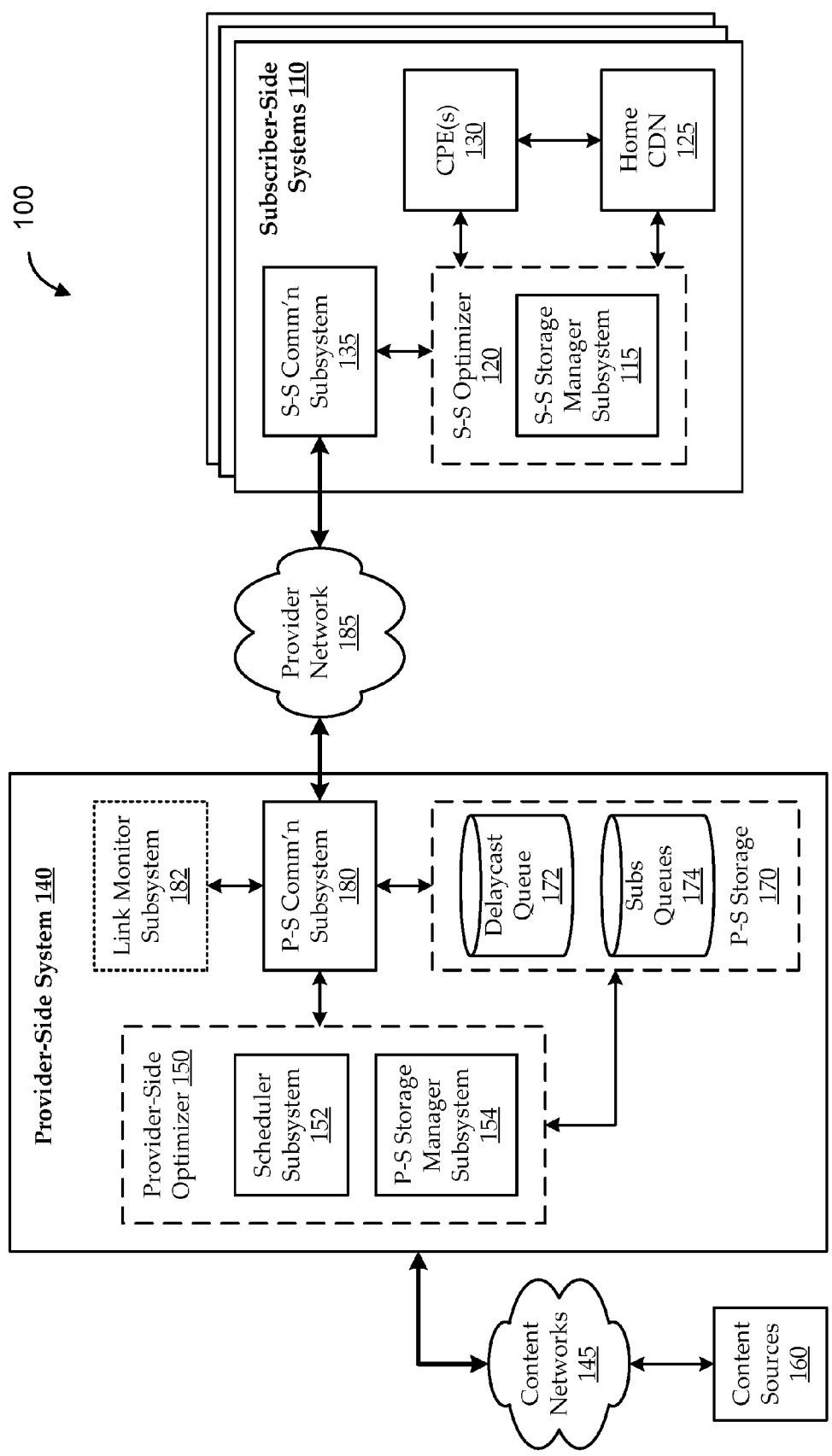
FIG. 1 shows a block diagram of an embodiment of a communications system having a provider-side system in communication with multiple subscriber-side systems over a provider network.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

As users of communications services desire more access to media content over data communications networks from more devices, providers of those services are seeking techniques for maximizing fulfillment of their customers' media demands without overloading their networks. For example, communications and/or media services providers can use various techniques in an attempt to deliver optimal amounts and types of content to subscribers at optimal times in context of finite network resources (e.g., finite bandwidth, throughput, etc.). This can involve scheduling of the network's communications links, including assigning and prioritizing content objects to queues for delivery over the communications links. In a typical communications network, optimization of link scheduling can be complicated by a number of factors, including difficulties in accurately predicting link usage at any given future time, difficulties in predicting and quantifying subscriber fulfillment, variable communication capacity, etc.

Some embodiments provide novel systems and methods for prioritizing queuing of content objects for delivery over a communications network in a manner that attempts to optimize both subscriber fulfillment and communications link resource usage. For example, content objects can be queued in particular queue regions according to a respective priority, which can be determined by a number of factors, such as subscriber fulfillment, subscriber fairness, presently scheduled objects, availability of link resources, etc. Some implementations can use opportunistically available link resources to deliver content from the queue (e.g., as opposed to other, subscriber queues that can exploit subscriber-provisioned bandwidth). Other implementations can use shared link resources that are pre-designated for a particular category of traffic (e.g., content objects offered under and/or otherwise falling under the scope of a media plan). Still other implementations can use a combination of opportunistic and pre-designated (e.g., provisioned) link resources. The queue position can be associated with an estimated delivery time. In some implementations, the estimated delivery time is used to determine and/or communicate a promise time for delivery of the content and/or to determine which of a number of offers can be provided to a subscriber for delivery and/or scheduling of requested content.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

Turning first to FIG. 1, a block diagram is shown of an embodiment of a communications system 100 having a provider-side system 140 in communication with multiple subscriber-side systems 110 over a provider network 185. The provider network 185 can include one or more of any suitable type of communications link and can be part of one or more of any suitable type of network, including, for example, leased high-bandwidth lines (e.g., raw Ethernet), virtual private large-area network services (VPLS), Internet protocol virtual private networks (IP VPN), or other types of public or private, wired or wireless networks.

Some functionality exploits resource sharing over multiple communications links of the provider network 185 (e.g., multiple subscribers share link resources over one or multiple "shared communications links" of the provider network 185). Certain network architectures allow bandwidth resources to be shared through multicasting (e.g., including multicasting, point-to-multipoint, broadcasting, etc.) and/or other techniques. In one illustrative implementation, the communications system 100 can be a satellite communications network with a provider-side system 140 (e.g., in a gateway or core node) in communication with subscriber terminals of subscriber-side systems 110 over satellite communications links (e.g., via carriers of spot beams of one or more satellites). For example, each communications link of the provider network 185 can include one or more antennas, satellites, etc. As communications are essentially broadcast from the satellite to the subscriber terminals, multicasting techniques can be used to communicate content once for receipt by multiple subscribers concurrently. Similar techniques can be used with certain other wireless communications link architectures. Some other wired infrastructures can also use similar techniques in shared portions of the network. For example, a cable network can be architected to have a shared pipe between a cable head-end and an intermediate node (e.g., a neighborhood aggregator), at which node the shared pipe splits into individual pipes (e.g., to each household). Resources of the shared pipe can often be shared using similar techniques to those described above.

The provider-side system 140 can be further in communication with one or more content sources 160 via one or more content networks 145, which can include any suitable types of content servers, network components, etc. used to deliver content to subscriber-side systems 110 as part of and/or via the provider-side system 140. For example, a content source 160 can be a content service provider website that provides users with access to movies, music, and/or other media over the Internet via their respective subscriber-side systems 110 and provider-side system 140.

Various types of functionality are described herein relating to communications between the provider-side system 140 on a provider side of the communications system 100 infrastructure and the one or more subscriber-side systems 110 on a subscriber side of the communications system 100 infrastructure. As illustrated, the provider-side system 140 includes a provider-side communications subsystem 180, and the subscriber-side systems 110 include subscriber-side communications subsystems 135. Each of the provider-side communications subsystem 180 and the subscriber-side systems 110 include functionality to support communications over the provider network 185, such as protocol support, service flow management, routing, etc. In some implementations, the provider-side system 140 can act substantially as a server and the subscriber-side systems 110 can act substantially as clients, and communications between the systems over the provider network 185 can be considered client-server communications over client-server links (e.g., persistent links between proxy clients and proxy servers). Accordingly, provider-side functions can be implemented as functions of server-side systems or components, service provider systems or components, gateways, head-ends, or the like. Similarly, subscriber-side functions can be implemented as functions of user-side systems or components, client-side systems or components, customer premises devices, subscriber modems, subscriber devices, or the like.

In some cases, various functions described herein are only available to subscribers of certain services from a service provider, such as subscribers to a media plan or other subscription service under which a subscriber's usage of communications and/or media services is governed by a contract or policy (e.g., a data allowance policy (DAP) or the like). For example, some queuing techniques described herein are applied only to requests for certain categories of data (e.g., video media) or only to requests associated with a subscription plan (e.g., a media plan, a DAP, etc.). In some implementations, queuing techniques described herein can be applied to requests according to whether the request is for content determined to be delayable, whether the request includes an explicit or implicit option by the subscriber to delay delivery, and/or for other reasons.

The service provider can own and/or control some or all of the components that facilitate the functionality, such as the provider-side system 140. In some embodiments, the service provider can also own some or all of the content sources 160, subscriber-side systems 110, infrastructure components, etc. For example, a service provider can offer certain functionality to subscribers by virtue of relationships with content providers, relationships with subscribers, ownership or control of provider-side systems, and ownership or control of certain subscriber-side devices.

In some instances, a single subscriber is associated with subscription services, and any subscriber-side devices used with those services are associated with that subscriber. In other instances, a single subscriber is associated with subscription services, but the subscriber can access services nomadically or otherwise, including through devices that are not associated with that subscriber (e.g., by logging in to a service, etc.). In still other instances, one or more subscribers are associated with subscription, but the media services can be accessed by additional users. For example, a subscriber can own a television through which subscription media services can be accessed by anyone in the house, including non-subscriber members of the household, guests, etc. In even other instances, one or more human or machine agents are associated with the subscriber and can interface with services on the subscriber's behalf. For example, a smart device disposed in the subscriber's network (e.g., integrated in or in line with the subscriber's modem, set-top box, etc.) can monitor user behavior and/or use other information to make smart requests for content on behalf of the subscriber. In some implementations, these smart requests can be considered by the provider just as any other explicit request by the subscriber. Accordingly, while certain functionality can be governed by (e.g., handled according to) a relationship between the subscriber and the provider, it is not always the subscriber (or a particular subscriber-associated device) that is interacting with, exploiting, and/or facilitating those services. Embodiments are intended generally to operate in and account for any of those scenarios, even though, for the sake of simplicity, embodiments are described with reference to the subscriber making content requests, interacting with subscription services via devices and interfaces, etc.

As will be described more fully below, embodiments of the subscriber-side systems 110 are configured to perform various types of functionality using a subscriber optimizer 120. For example, the subscriber optimizer 120 can help manage content requests from subscribers and content delivery to subscribers via subscriber devices. In some implementations, the subscriber optimizer 120 can communicate with the provider optimizer 150 of the provider-side system 140 in such a way as to effectuate advanced optimization functions. For the sake of simplicity, certain client-server types of functionality can be referred to as involving communications over virtual (or logical) communications links, though these "links" can, in fact, include a number of physical links from one or more communications infrastructures. For example, the subscriber optimizer 120 and the provider optimizer 150 can act as a proxy client and a proxy server, respectively, in communication over a proxy tunnel that facilitates acceleration, optimization, and other functionality. Embodiments of the subscriber-side systems 110 can include subscriber-side communications subsystems 135 as part of, or in communication with, their respective subscriber-side optimizers 120. The subscriber-side communications subsystems 135 can transmit communications to and receive communications from the provider network 185 and can perform any suitable transport-level and/or related processing.

In some embodiments, the subscriber-side systems 110 can include one or more customer premises devices (e.g., set-top boxes, televisions, home network devices, etc.), referred to as "customer premises equipment" or "CPE" 130. The CPEs 130 can provide user interface functionality through which a subscriber can interact with service provisions, for example, by requesting media content, setting preferences, etc. Embodiments can also be configured to implement a home content distribution network (CDN) 125. The home CDN 125 can include any useful types of storage and/or networking components. For example, embodiments of the home CDN 125 can include a single storage device (e.g., a server or disk drive), distributed local storage (e.g., a RAID array, set of servers, etc.), networked storage (e.g., using a local area network, a storage area network, "cloud" storage, or the like), etc. Various embodiments of the subscriber optimizer 120 can be configured to manage (e.g., direct, monitor, etc.) functions of the CPE(s) 130, the home CDN 125, communications among those components, communications between those components and other nodes of the communications system 100, etc.

For added clarity, various functional subsystems are shown. These functional subsystems can be implemented by any suitable system, subsystem, or component shown or by others not shown. Embodiments of the subscriber-side systems 110 include a subscriber-side storage manager subsystem 115 implemented as a functional subsystem of the subscriber optimizer 120. The subscriber-side storage manager subsystem 115 can handle various subscriber side storage functions, including, for example, determining what objects are stored in the home CDN 125, storing objects in and/or removing objects from the home CDN 125, etc.

Some subscriber-side systems 110 can be implemented as subscriber modems (e.g., satellite modems), dedicated devices, hardware or software of set-top boxes, or in any other suitable manner. In one illustrative implementation, the subscriber-side system 110 is embodied in a subscriber modem that includes a subscriber optimizer 120 (e.g., as integrated hardware and/or software) and has one or more ports for communicating with a home CDN 125 and one or more CPEs 130. For example, the subscriber modem has a universal serial bus (USB) port, and the home CDN 125 is implemented on a USB thumb drive. In other implementations, the home CDN 125 can be implemented using internal storage of the modem or as other types of removable storage, networked storage, etc. The CPEs 130 can include televisions or video monitors, computers (e.g., laptops, tablets, etc.), smart phones, smart appliances, and/or any other equipment that can benefit from services provided over the communications infrastructure (and/or support equipment thereto).

Though not shown, embodiments of the subscriber system 110 can include additional functional components. For example, implementations can include request handler functionality, graphical user interface (GUI), functionality, web interface functionality, etc., as separate components and/or as components or functions of the subscriber optimizer 120, one or more CPEs 130, etc. For example, a subscriber can view a website on a web-enabled CPE 130 that displays a number of media content offerings via a GUI (e.g., of a web browser or app). When the subscriber interacts with one of the content offerings (e.g., by clicking on, "mousing over," or otherwise engaging with an icon), the GUI can pass relevant information to request handling functionality of the subscriber optimizer 120, which processes and communicates appropriate request-related information to the provider optimizer 150 of the provider system 140 via the provider network 185. The request can be processed to determine, for example, whether and/or when to communicate the requested content to the subscriber (e.g., whether now or delayed, etc.), how to communicate the content (e.g., whether to multicast, which coding and/or modulation scheme to apply, which carriers and/or spot beams to use, etc.), how much to charge for the content, etc.

Embodiments of the provider-side system 140 can include a scheduler subsystem 152 and/or a provider-side storage manager subsystem 154, illustrated as functional subsystems of the provider optimizer 150. Some implementations of the scheduler subsystem 152 seek to optimize both link resources and subscriber engagement from a resource-level (e.g., link-level) perspective. For example, the scheduler subsystem 152 can handle queue prioritization functionality, link scheduling functionality, etc. Some implementations of the provider-side storage manager subsystem 154 seek to optimize both link resources and subscriber engagement from a subscriber-level (e.g., subscriber cluster-level, subscriber cache-level, etc.) perspective. For example, the provider-side storage manager subsystem 154 can maintain cache models (e.g., dictionaries, etc.) of each subscriber's home CDN 125. In some implementations, the provider-side storage manager subsystem 154 can maintain additional information, such as subscriber request histories, content engagement histories, and the like.

Many of the functions described herein, including request handling, involve assigning content objects to the delaycast queue 172 for delivery over the provider network 185. For example, various queue assignment and prioritization techniques can be used in a manner that attempts to realize concurrent optimizations across the network for both subscriber fulfillment and shared communications link resource usage. This can include determining which content objects are presently in a "watch now" portion of the delaycast queue 172, whether a requested content object is a watchnowable object, whether a requested content objects can and/or should be queued for delayed delivery, etc. Some implementations can further determine and generate offers to the requesting subscriber to encourage the requesting subscriber to choose a less resource-intensive usage of the communications system 100 in exchange for a benefit (e.g., reduced or no cost to the subscriber for delivery of the content, etc.). For example, the offer can permit the subscriber to opt for delayed delivery of the requested content (e.g., at a time that is more favorable for the network), to select an alternate content object, etc.

Embodiments can communicate objects from the delaycast queue 172 according to one or more types of available capacity. For example, network resources are typically provisioned for a certain amount of usage by a certain number of subscribers (e.g., a certain minimum rate, for example, in kilobits per second, is provisioned to each subscriber at various times of day). A link monitor subsystem 182 (illustrated as being in communication with the provider-side communications subsystem 180) can be used to monitor a present state of the provider network 185 to determine whether there is presently available capacity. The available capacity can be assigned to such a usage (e.g., provisioned for use in delivering objects from the delaycast queue), "opportunistically available" (not assigned to such a usage or provisioned for some other usage, but presently available), some combination of assigned and opportunistically available capacity, etc.

Figure 2:
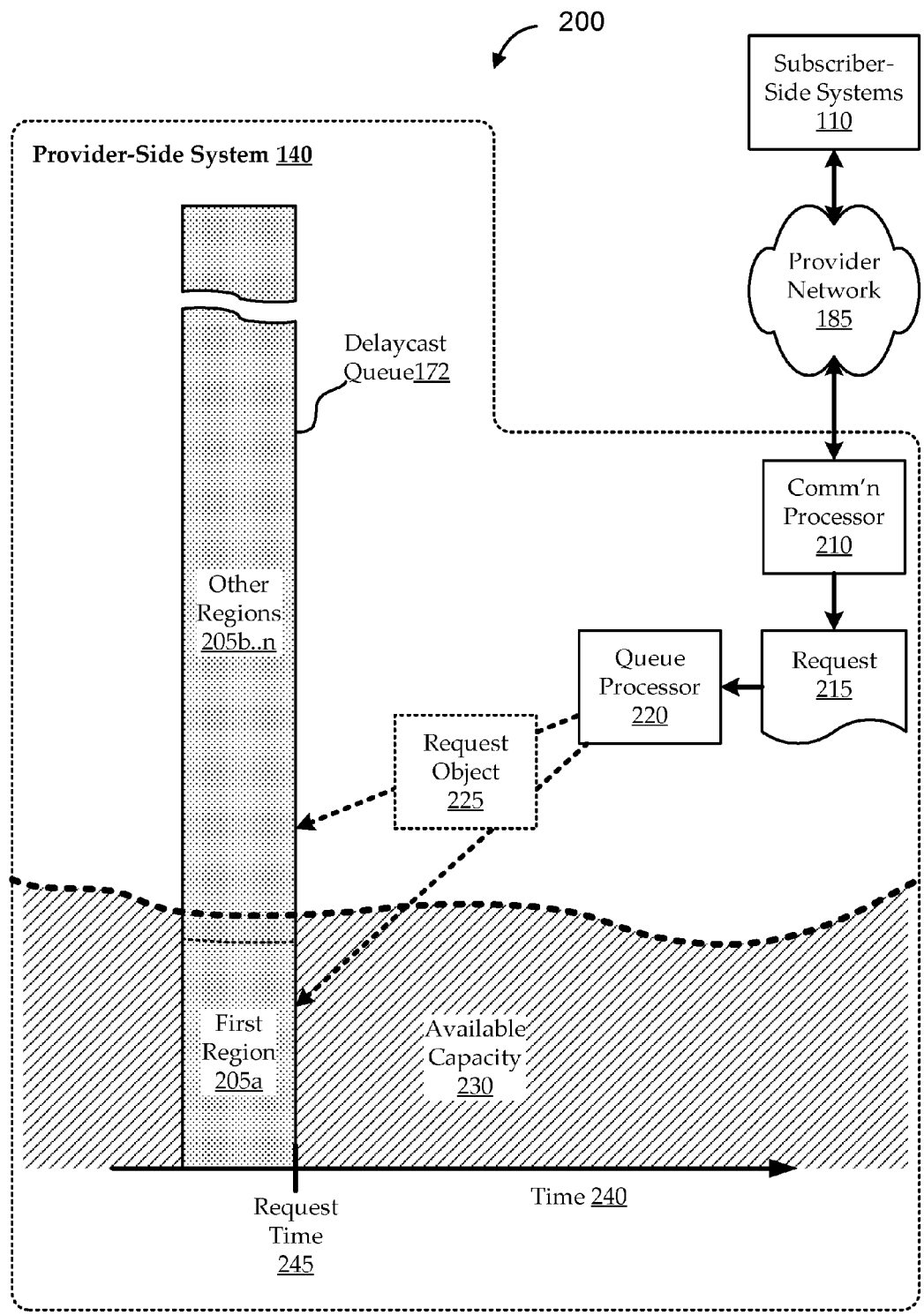
FIG. 2 shows a block diagram of a simplified communications environment having subscriber-side systems in communication with a provider-side system over a provider network, according to various embodiments.

As described above, queuing and related functions can be handled by any suitable subsystem of the provider-side system 140 (in some implementations, in conjunction with subsystems of the subscriber-side systems 110). For the sake of focusing more clearly on various novel aspects, FIG. 2 shows a block diagram of a simplified communications environment 200 having subscriber-side systems 110 in communication with a provider-side system 140 over a provider network 185, according to various embodiments. The provider-side system 140 of the communications system 200 is illustrated as including a communications processor 210, a queue processor 220, and a delaycast queue 172. The communications environment 200 can perform some or all of the functionality described with respect to the communications system 100 of FIG. 1. For example, the communications processor 210 can implement functionality of the provider-side communications subsystem 180 (e.g., and/or the link monitor subsystem 182 and/or any other suitable components), the queue processor 220 can implement functionality of some or all of the subsystems of the provider-side optimizer 150, and the delaycast queue 172 can be one or more delaycast queues 172 that are part of a provider-side storage subsystem 170 (e.g., also including one or more subscriber queues 174). The delaycast queue 172 can include a number of previously requested content objects in a priority order arranged according to a number of queue regions 205. At least some of the queued content objects have associated promise times. For example, a first queue region 205a can correspond to a first timeframe so that content objects queued in the first queue region 205a are promised for delivery over the provider network 185 to at least a requesting subscriber-side system 110 within the first timeframe, and a second queue region 205b can correspond to a second timeframe so that content objects queued in the second queue region 205b are promised for delivery over the provider network 185 to at least the requesting subscriber-side system 110 within the second (e.g., longer) timeframe. The multiple queue regions 205 can be defined in a number of different ways, according to various implementations. For example, as illustrated, some implementations define a first queue region 205a dynamically according to presently available capacity 230 (i.e., at a particular time on a timeline 240). As discussed above, the presently available capacity can be assigned capacity, opportunistically available capacity, some combination thereof, etc.

Embodiments of the communications processor 210 operate to receive a delayable content request 215 from a requesting subscriber-side system 110 for delivery of a content object over the communications infrastructure (e.g., one or more communications links of the provider network 185). For example, a request is received from a subscriber-side system for a content object, and a determination is made (e.g., by the communications processor 210) as to whether the requested content object is a delayable content object (e.g., as described above). A request object 225 can be generated and/or identified according to the request 215. For example, the request object 225 can include the requested content object itself, an identifier of or pointer to the requested content object, etc. Embodiments of the queue processor 220 operate to determine a proposed queue depth (e.g., a location within the priority queue) for the request object 225 with respect to the queue regions 205 of the delaycast queue 172. For example, the queue depth is determined to be in the first queue region 205a when the requested content object is deliverable within the first timeframe, and the queue depth is determined to be in the second queue region 205b when the requested content object is not deliverable within the first timeframe and the requested content object is deliverable within the second timeframe. Similarly, the queue depth can be determined to be in any of a number of queue regions 205 for implementations having more than two queue regions 205. Embodiments of the queue processor 220 can queue the requested content object accordingly, for example, at a position in the first or second (or other) queue region 205 according to the proposed queue depth.

Figure 3:
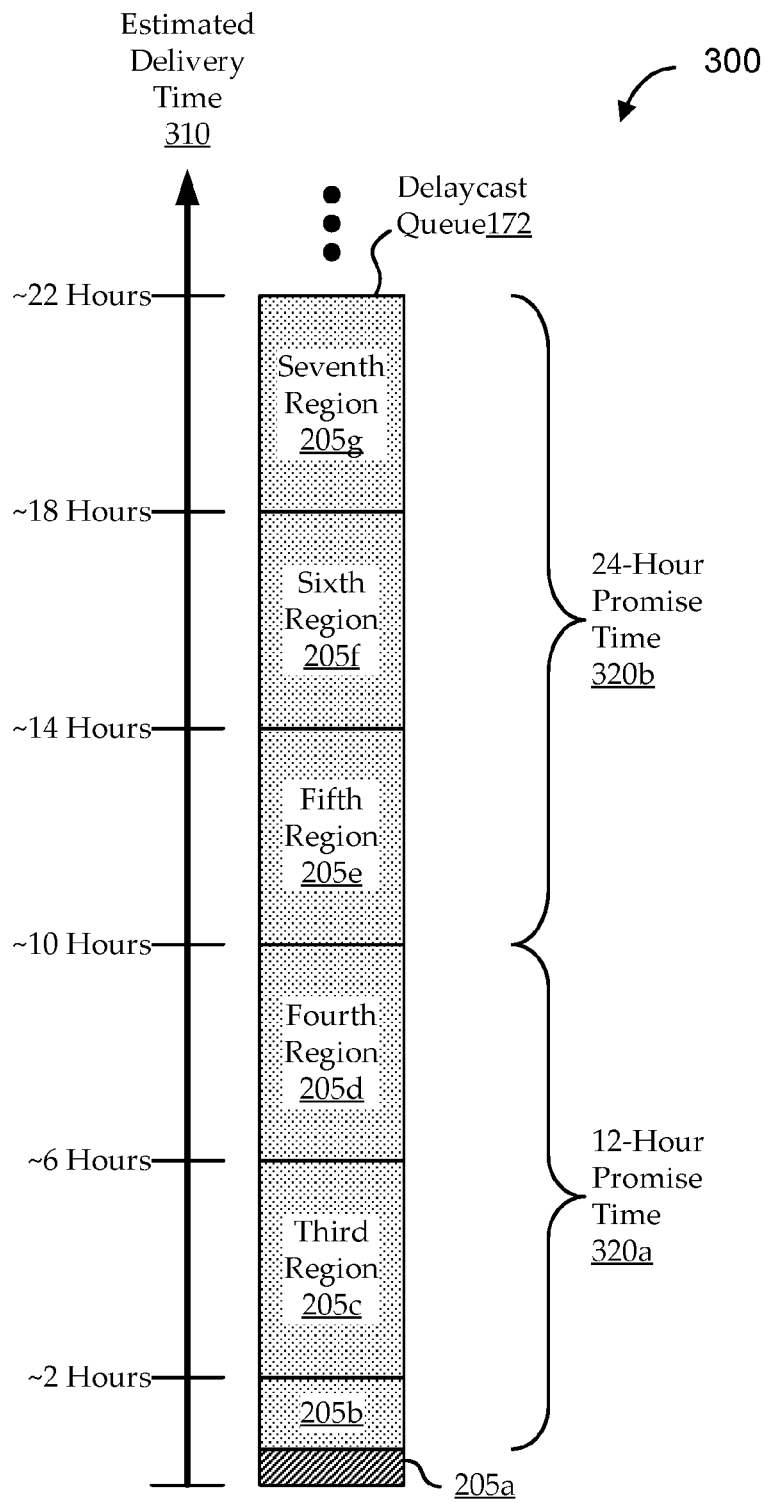
FIG. 3 shows an example of a queuing configuration to illustrate certain features of some implementations.

Turning briefly to FIG. 3, an example of a queuing configuration 300 is shown to illustrate certain features of some implementations. The example configuration 300 shows a delaycast queue 172 with at least seven queue regions 205. The configuration 300 is intended only to represent one possible implementation, and is not intended to illustrate scale or to limit other possible implementations. As illustrated, each queue region 205 is associated with an estimated delivery time 310. For example, the first queue region 205a can be associated with a watch now timeframe (as described below) or a relatively short timeframe (e.g., minutes), the second queue region 205b can be associated with an estimated delivery time of somewhere between the end of the first queue region 205a and two hours, and subsequent queue regions 205c ... n can be associated with subsequent four-hour increments of estimated delivery timeframes. For the sake of illustration, a content object presently located in the fourth queue region 204d is estimated for delivery to at least the requesting subscriber within about the next six to ten hours. As new content objects are assigned to the delaycast queue 172, positions of any previously queued object deeper in the queue can potentially be impacted. For example, inserting a requested object in the delaycast queue 172 can potentially delay delivery of deeper objects in the queue.

The configuration illustrates that queue regions 205 can be associated with both the estimated delivery time 310 and an initial promise time 320. In some implementations, the initial promise time 320 can be close or equivalent to the estimated delivery time 310 for some or all of the queue regions 205. In other implementations, the initial promise times 320 can be different from the estimated delivery times 310. As illustrated, if a content object is initially placed in the delaycast queue 172 in any of the second, third, or fourth queue regions 205, the queue processor 220 can initially associate the content object with a promise time of 12 hours. This can indicate that, even with an initial estimated delivery time 310 of ten hours, there is sufficient confidence (e.g., 99.99%, or any other suitable threshold confidence level) that the content object can be delivered within a maximum of 12 hours given present queue contents, expected availability of communications resources, and/or other factors. Alternatively, the initial promise time 320 can indicate a high confidence of delivery within a smaller timeframe (e.g., within ten hours), while leaving an additional margin to facilitate more reprioritizations of the queue (e.g., due to prioritizing subsequent requests) with fewer potential violations of promise times. For example, if a content object were initially queued at the end of the fourth queue region 205d (i.e., such that the estimated delivery time is close to ten hours and the initial promise time 320 is 12 hours), the content object could be pushed back in the queue by approximately two hours (e.g., by subsequent, higher priority requests) without likely violating the assigned promise time.

Expected delivery times 310 and promise times 320 can operate differently with respect to queue regions 205 and queued content objects. For example, as new content objects are inserted into the delaycast queue 172, previously queued, lower priority content objects can potentially move deeper into the queue; and, as content objects are delivered from the delaycast queue 172 to subscriber-side systems 110 over the provider network 185, still-queued content objects can potentially advance their respective positions toward the front of the queue (e.g., eventually advancing to the front of the queue for delivery). The estimated delivery times 310 for the queued content objects can constantly change, depending on each content object's respective present position in the delaycast queue 172 (e.g., and, possibly, based on additional factors, such as updated predictions of link capacity, etc.). In some implementations, promise times 320 are also dynamically or periodically updated to reflect changes in content object position in the queue, changes in network conditions, and/or other factors. In other implementations, promise times 320 are assigned to each content object when it is placed in the queue, and the promise times 320 remain static thereafter. The promise times 320 can also depend on the request time. For example, resource availability trends can indicate that the most excess capacity is available between 1:00 am and 4:00 am; so that requests slotted for certain queue regions are assigned a 24-hour promise time if received between 1:00 am and 1:00 pm, and requests slotted for the same queue regions are assigned a 12-hour promise time if received between 1:00 pm and 1:00 am. Similarly, promise times 320 can be associated with set time windows (e.g., each day can be broken into four, six-hour windows, or the like), and the promise time associated with a request is assigned according to those windows (e.g., the promise time is some number of windows plus the remaining time in the current window).

For the sake of illustration, a content object is initially assigned to a queue location associated with an estimated delivery time 310 of ten hours and a promise time 320 of 12 hours. After five hours have elapsed, the content object has advanced in the queue to a location associated (e.g., statically or dynamically) with an estimated delivery time 310 of six hours, though the promise time 320 remains at 12 hours. Accordingly, to fulfill the promise time, implementations of the queue processor 220 can take steps to advance the content object from the six-hour location to the front of the queue for delivery within the next seven hours (i.e., between the present five-hour mark and the end of the 12-hour promise time).

The sizes of some or all of the queue regions 205 can be determined in any suitable manner, and some implementations can determine sizes of different queue regions 205 in different ways. In one implementation, a size of the first queue region 205a is determined according to a presently available (e.g., opportunistic or assigned) capacity 230 at a request time 245 (e.g., the time at which the request 215 is received and/or being processed by the queue processor). For example, the deepest position in the delaycast queue 172 that is considered part of the first queue region 205a can be determined as, or according to, an amount of content in the delaycast queue 172 that can be delivered within the first timeframe given presently available (e.g., including near-term predicted) capacity. For implementations in which the first queue region 205a is a "watch now" region of the queue, the size of the first queue region 205a can be determined according to how much content can be delivered as watch now content (e.g., substantially and/or apparently in real time) from the delaycast queue 172 given presently available capacity 230. In other implementations, the size of the first queue region 205a can be determined in a similar manner to that of other queue regions 205. For example, some implementations determine the size of some or all queue regions 205 based on a prediction of available channel capacity between the request time and an end of the respective timeframe of the queue region for which size is being determined. The prediction of available channel capacity can be calculated according to a substantially constant data rate available over at least a portion of the timeframe (e.g., assuming that a current or other throughput will be supported on average). Additionally or alternatively, the prediction of available channel capacity can be calculated according to a substantially fixed block of capacity reserved during at least a portion of the timeframe. Additionally or alternatively, the prediction of available channel capacity can be calculated according to a statistical estimation of dynamic future channel capacity over at least a portion of the timeframe. For example, statistics can be maintained and used based on past usage over time, expected future demand, provisioning, etc.

Returning to FIG. 2, in some embodiments, the communications processor 210 operates to communicate the requested content object over the provider network 185 from the delaycast queue 172 to at least the requesting subscriber-side system 110 according to its queue depth. For example, the communications processor 210 can operate to communicate the requested content object as it reaches the front of the delaycast queue 172, so that the content object is effectively delivered within its associated promise time (e.g., absent violations of the promise time). The communication can be a multicast communication (e.g., using a multicast protocol, a broadcast protocol, point-to-multipoint protocol, etc.), a unicast communications, or any other suitable type of communication. Some implementations exploit opportunistic bandwidth by communicating content from the delaycast queue 172 as bandwidth becomes available (e.g., using presently non-provisioned and/or unused bandwidth resources of the link). Other implementations exploit assigned (e.g., dedicated, pre-scheduled, pre-provisioned, etc.) bandwidth for content communications.

The request objects 225 can be assigned to the delaycast queue 172 in any suitable manner. In some implementations, the queue processor 220 can determine that a request object 225 is deliverable within the first timeframe (associated with the first queue region 205a) only when the request object 225 is deliverable within the first timeframe when placed at an end of the first queue region 205a according to presently available link capacity 230. For example, the first timeframe is a watch now timeframe, so that objects in the first queue region 205a are watch now objects (e.g., content objects that are scheduled for delivery substantially in real time and/or in a manner that appears to one or more subscribers as substantially real time). In such an implementation, the queue processor 220 can determine whether the request object 225 can be placed in the first queue region 205a by determining whether the request object 225 could be delivered as a watch now object if it were placed at the end of the first queue region 205a. In other implementations, the queue processor 220 can determine that a request object 225 is deliverable within the first timeframe only when delivering the request object 225 within the first timeframe violates fewer than a predetermined threshold of promise times associated with queued content objects. For example, at least some of the queued content objects have associated promise times, such that at least one requesting subscriber has been promised the respective queued content object within some timeframe associated with the promise time (e.g., within 24 hours from the time when the request for that object was confirmed). In such an implementation, the queue processor 220 can determine whether the request object 225 can be placed in the first queue region 205a by determining whether placing the request object 225 in the first queue region 205a would cause delivery of queued objects at deeper positions (e.g., lower priority positions in the queue) to be delayed to the point of violating promise times. A threshold can be used to determine how many promise times can be violated before the decision is made not to queue the request object 225 in a particular location. For example, some implementations do not allow any violations, others can allow some maximum non-zero number of violations, still others can provide for a dynamic threshold based on other factors (e.g., fairness), and even others can use an infinite threshold (e.g., thereby forcing the request always to be queued, or effectively removing the threshold from the determination to allow reliance on other factors). Similarly, some embodiments of the queue processor 220 can determine that a request object 225 is deliverable within the second and/or subsequent timeframes only when delivering the request object 225 within one or more of those timeframes violates fewer than a predetermined threshold of promise times associated with queued content objects.

Suppose, for the sake of illustration, that a first request object was promised to a respective requesting subscriber within 18 hours of an associated first request time; close to 18 hours have passed since the first request time, and the first request object is nearing the front of the delaycast queue 172. When a second request is received for a second request object, the queue processor 220 determines that queuing the second request object ahead of the first request object is likely to cause delivery of the first request object to be delayed beyond 18 hours. Some implementations of the queue processor 220 can determine, accordingly, that the second request object should be queued in a position that is deeper than that of the first request object. Other determinations may reveal that other promise times are likely to be violated deeper in the queue, and the request object can end up being queued in any deeper position and/or region of the queue where no (or a sufficiently low number of) previously assigned promise times are violated. Other implementations of the queue processor 220 can determine that, while promise times for the first request object are likely to be violated, there is sufficient justification to accept the violation based on other factors.

In various embodiments the promise times 320 and/or estimated delivery times 310 can be used to generate one or more offers to the subscriber and/or to provide the subscriber with other relevant information. Some implementations communicate an indication of the promise time over the communications infrastructure to the requesting subscriber. For example, when the subscriber requests the content object, a response can be communicated (e.g., and displayed to a graphical user interface of a subscriber-side CPE) that indicates the promise time associated with the requested object. Certain implementations alternatively or additionally use the promise times to generate and/or display options or offers corresponding to the promise times and/or other information. According to some embodiments, the delayable content request is first received as a pre-request. In response to the pre-request, the communications processor 210 can communicate a set of options (e.g., offers, prompts, etc.) for delivery of the requested content object to the requesting subscriber. For example, some options can include offers in exchange for benefits. When one of the options (e.g., and/or when no option) is implicitly or explicitly selected, a confirmation request can be received from the requesting subscriber indicating a selected one (or none) of the set of options. In such embodiments the queue processor 220 can queue the requested content object in the queue in response to and according to the confirmation request.

Various components and/or subsystems of the provider-side system can be implemented in any suitable manner. For example, the functions of the provider-side system 140 and the subscriber-side system 110 can be implemented in hardware and or software, each in a single device, or with functions spread among multiple devices, components, systems, etc. Some implementations can include one or more Application Specific Integrated Circuits (ASICs) adapted to perform a subset of the applicable functions in hardware. Other implementations can have functions performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers.

Figure 4:
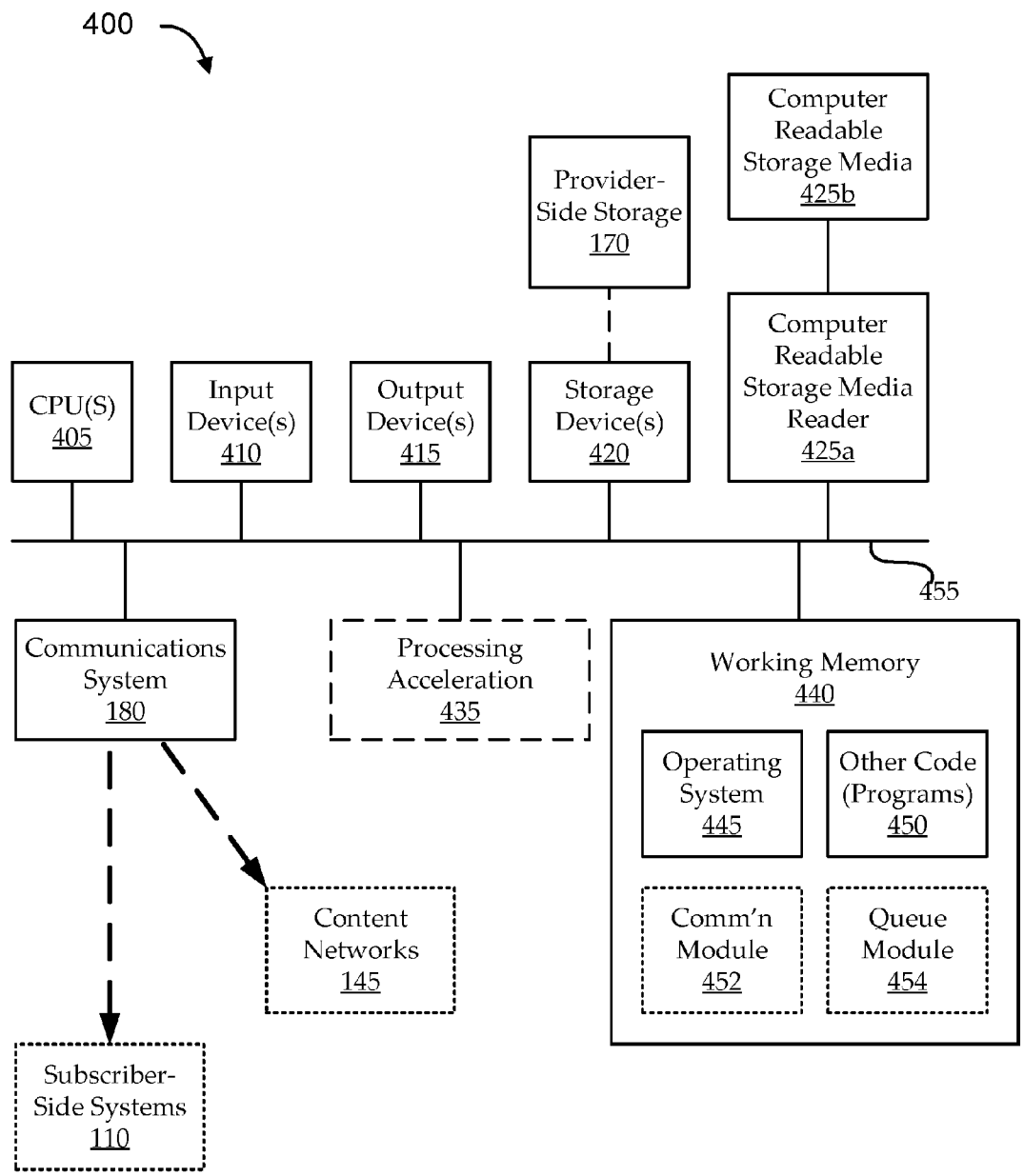
FIG. 4 shows an illustrative computational system for implementing certain provider-side functionality, according to various embodiments.

FIG. 4 shows an illustrative computational system 400 for implementing certain provider-side functionality, according to various embodiments. The computational system 400 can include or perform functionality of the communications processor 210 and/or the queue processor 220, such as described above with reference to FIGS. 1 and 2. For the sake of simplicity, the computational system 400 is shown including hardware elements that can be electrically coupled via a bus 455. However, embodiments of the computational system 400 can be implemented as or embodied in single or distributed computer systems, in one or more locations, or in any other useful way. For example, while illustrated as a single computational system 400, functionality can be implemented across multiple computational systems (e.g., in a distributed system, in the "cloud," etc.) that can be in direct or indirect communication with each other.

The hardware elements can include one or more central processing units (CPUs) 405, one or more input devices 410 (e.g., a mouse, a keyboard, etc.), and one or more output devices 415 (e.g., a display device, a printer, etc.). The computational system 400 can also include one or more storage devices 420. By way of example, storage device(s) 420 can be disk drives, optical storage devices, solid-state storage device such as a random access memory (RAM) and/or a read-only memory (ROM), which can be programmable, flash-updateable and/or the like. In some embodiments, the storage devices 420 can include or can be in communication with the provider-side storage system 170, as described above.

The computational system 400 can additionally include a computer-readable storage media reader 425a, a communications system 430 (e.g., a modem, a network card (wireless or wired), an infra-red communication device, etc.), and working memory 440, which can include RAM and ROM devices as described above. In some embodiments, the computational system 400 can also include a processing acceleration unit 435, which can include a DSP, a special-purpose processor and/or the like.

The computer-readable storage media reader 425a can further be connected to a computer-readable storage medium 425b, together (and, optionally, in combination with storage device(s) 420) comprehensively representing remote, local, fixed, and/or removable storage devices plus storage media for temporarily and/or more permanently containing computer-readable information. The communications system 430 can permit data to be exchanged with a network and/or any other computer described above with respect to the computational system 400. For example, as described with reference to FIG. 1, content traffic and/or other information can be communicated via the communications system 430 to content networks 145, subscriber-side systems 110 (e.g., over provider network 185), etc.

The computational system 400 can also include software elements, shown as being currently located within a working memory 440, including an operating system 445 and/or other code 450, such as an application program (which can be a client application, web browser, mid-tier application, relational database management system (RDBMS), etc.). In some embodiments, one or more functions of the provider-side optimizer 140 and/or other provider-side functions can be implemented as application code 450 in working memory 440. For example, the application code 450 can include instructions which, when executed, can cause one or more CPUs 405 to perform respective functions.

Figure 5:
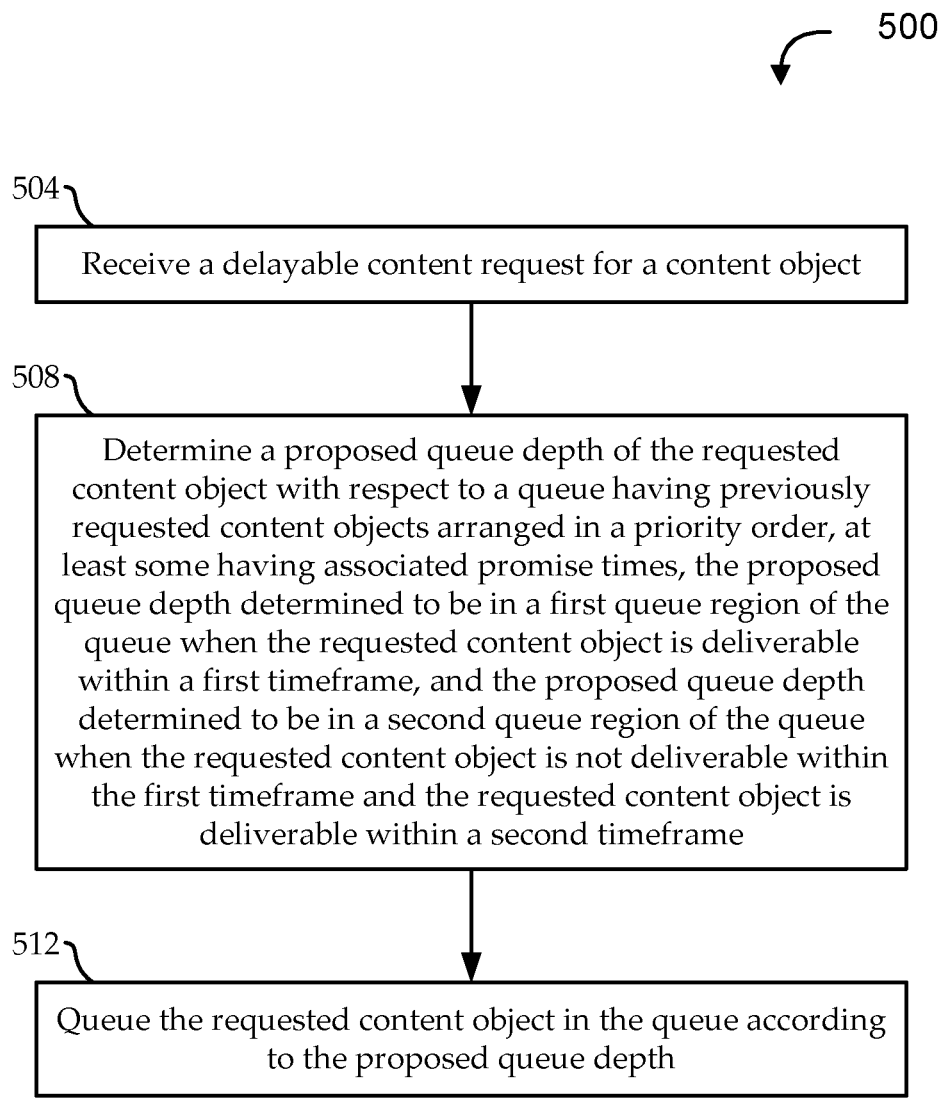
FIG. 5 shows a flow diagram of an illustrative method for predictive delaycast feedback, according to various embodiments.

Various system embodiments, including those described above with reference to FIGS. 1-4 can be used to perform functions, including those described below in FIGS. 5 and 6. FIG. 5 shows a flow diagram of an illustrative method 500 for predictive delaycast feedback, according to various embodiments. The method 500 is described in context of a provider system operating within a communications infrastructure, for example, like the provider systems 140 described above with reference to FIGS. 1-4. The same or similar techniques can be applied to any type of provider system that operates within a communications infrastructure configured to provide an at least partially shared forward link to at least some of a number of subscriber systems over the link. Embodiments of the method 500 begin at stage 504 by receiving a delayable content request by a provider-side system of a communications infrastructure for a content object. As discussed above, this can involve receiving a content request and determining that the request is for a delayable content object. For example, a content request for delayable content can be received by a communications processor of a provider-side communications subsystem 180 via links of the provider network 185 from a communications processor of a subscriber-side communications subsystem 135.

At stage 508, a proposed queue depth can be determined for the requested content object with respect to a queue (e.g., a delaycast queue). The queue can have a number of previously requested content objects arranged in a priority order, and at least some of the queued content objects can have associated promise times. For example, the queue can be implemented by one or more memory devices of the provider-side storage 170 of FIG. 1 (e.g., a single device, array of devices, or any other configuration of collocated or distributed devices, including SRAM, DRAM, flash RAM, EEPROM, magnetic media (disk drive, etc.), etc.), and positions of objects in the queue can be maintained by keeping track of block locations, logical and/or physical memory addresses (e.g., using address registers, pointers, etc.), etc.

The proposed queue depth can be determined to be in a first queue region of the queue when the requested content object is deliverable over the communications infrastructure (e.g., a provider network) within a first timeframe. For example, the requested content object is considered to be deliverable within the first timeframe when the requested content object can likely be delivered within the first timeframe even when placed at the end of the first queue region (e.g., according to presently available opportunistic link capacity). Additionally or alternatively, the requested content object can be considered as deliverable within the first timeframe when delivering the requested content object within the first timeframe is likely to violate fewer than a predetermined threshold of promise times associated with queued content objects. The proposed queue depth can be determined to be in a second queue region of the queue when the requested content object is not deliverable within the first timeframe and the requested content object is deliverable within a second timeframe that is longer than the first timeframe. For example, the first timeframe can be a watch now timeframe (e.g., substantially in real time), and the second timeframe can be appreciably longer (e.g., 2 hours, 12 hours, 24 hours, etc.). Implementations of the queue can have any suitable number of queue regions associated with any number of timeframes. For example, some implementations determine the queue depth to be as deep as needed to avoid violating fewer than a predetermined threshold of promise times associated with previously queued content objects. As described above, some implementations can opt to violate promise times according to other policies or factors, such as fairness.

At stage 512, the requested content object can be queued (e.g., inserted or otherwise placed in the queue) according to the proposed queue depth. Some implementations place the content object in the queue by storing data blocks of the content data in one or more physical storage devices that implement the queue. Other implementations place the content object in the queue by updating pointers and/or other logical identifiers in a manner that logically associates the queue and proposed queue depth with data blocks of the content data physically stored in one or more physical storage devices. In some embodiments (e.g., before or after actually queuing the object at stage 512), the determined queue depth can be used to assign a promise time to the requested object. Implementations of the method 500 can communicate the promise time, one or more options (e.g., offers), the requested object, and/or other related information to at least the requesting subscriber over the communications infrastructure.

According to some implementations, the queue can be implemented by one or more storage devices 420 and/or by one or more computer-readable storage media 425b, as described in FIG. 4. In such implementations, request handling (e.g., receiving and/or routing of requests, determining whether requests are for delayable content objects, etc.), queue handling (e.g., determinations of queue depth, assignment of objects to the queue, etc.) and/or other functionality involved in carrying out the steps of the method 500 can be performed by one or more processors 405 according to instructions stored in a working memory 440. Queuing of the content objects can involve placing (e.g., writing, moving, etc.) data blocks of the content objects to the storage devices 420 and/or computer-readable storage media 425b, and/or the queuing can involve instructions in working memory 440 to cause the processor(s) 405 to change any suitable logical designations to associate the particular content object with a particular storage location.

Figure 6:
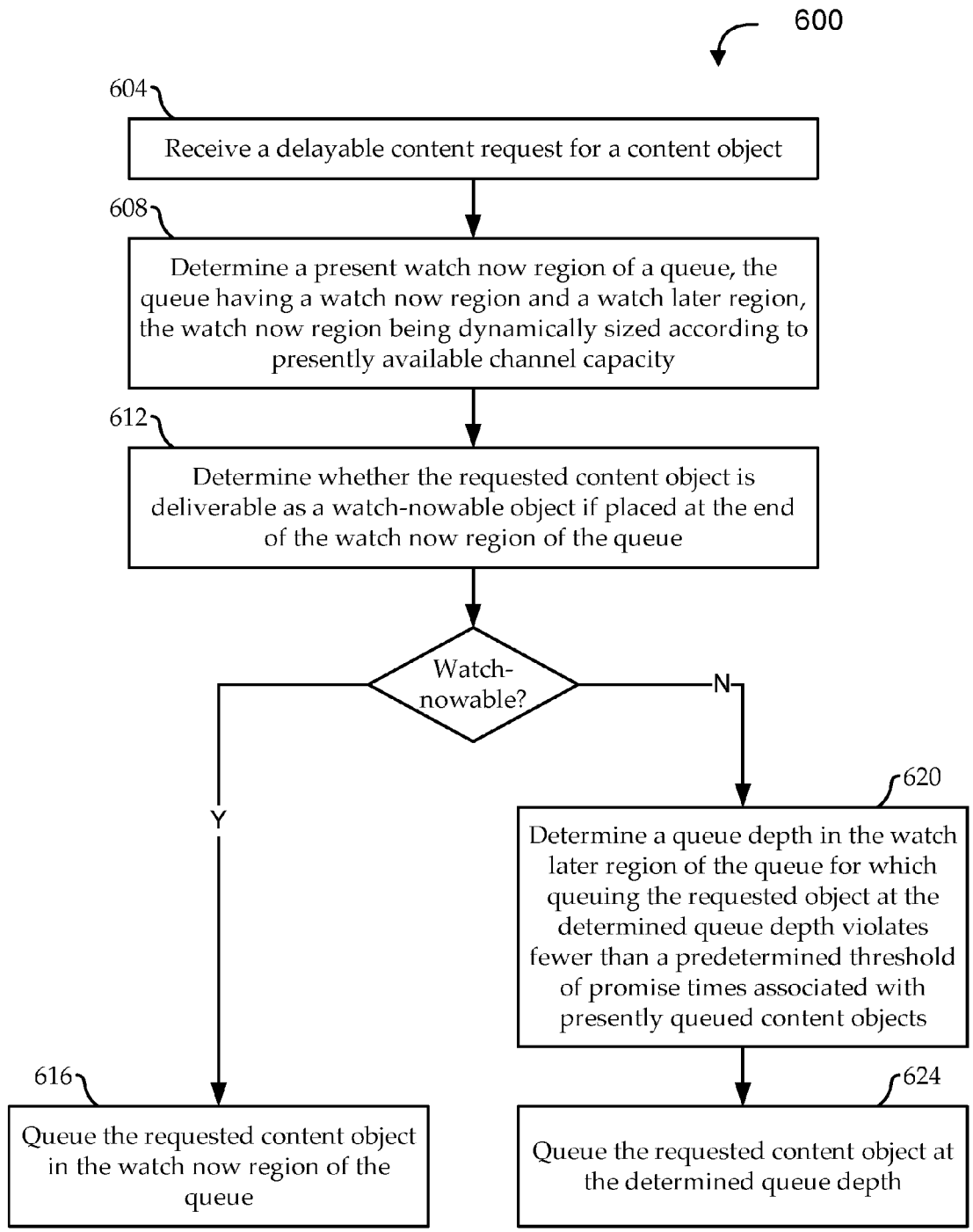
FIG. 6 shows a flow diagram of another illustrative method for predictive delaycast feedback, according to various embodiments.

FIG. 6 shows a flow diagram of another illustrative method 600 for predictive delaycast feedback, according to various embodiments. The method 600 can be an embodiment of the method 500 of FIG. 5. In some embodiments, the method 600 begins at stage 604 by receiving a delayable content request by a provider-side system of a communications infrastructure for a content object. At stage 608, a present watch now region of a queue can be determined. For example, the queue can have watch now and watch later (or multiple watch later) regions, and the watch now region can be dynamically determined according to presently available opportunistic link capacity substantially at the time of the request (e.g., "presently" available can include a near-term prediction of capacity at least until the time the content object is likely to be delivered).

At stage 612, embodiments can determine whether the requested content object is deliverable as a watch nowable object if placed at the end of the watch now region of the queue. If so, at stage 616, the requested content object can be queued in the watch now region of the queue (e.g., at the end of the first queue region or according to one or more other prioritization determinations). Some implementations only consider the requested content object to be deliverable as a watch nowable object when it is further determined that placing the requested content object in the watch now region of the queue violates fewer than a predetermined threshold of promise times associated with presently queued content objects. If the requested content object is determined not to be deliverable as a watch nowable object if placed at the end of the watch now region of the queue, embodiments can determine a queue depth in the watch later region of the queue for which queuing the requested object at the determined queue depth violates fewer than a predetermined threshold of promise times associated with presently queued content objects at stage 620 (e.g., the same threshold as can be used with respect to the first queue region or a different threshold). In such cases, at stage 624, the requested content object can be queued at or according to the determined queue depth. As described above, embodiments can also associate a promise time with the requested content object according to the determine queue depth and or according to where the requested content object is actually queued.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

Some embodiments are described with specific reference to "content objects" and/or "media." As used herein, content objects are not intended to be limited to particular types of media, and can generally describe any data object or sub-object that includes content data relating, for example, to media content (e.g., movies, television episodes, other video, music, etc.), software distribution content, online periodical distribution content (e.g., magazines, etc.), application distribution content (e.g., apps, etc.), etc. Further, terms such as "optimize" or "maximize" are intended to connote a relative or desired outcome, rather than an absolute outcome, and should not be considered as limiting potential embodiments. For example, embodiments described with reference to optimization are intended to include even variations deemed to be sub-optimal. Further, a number of "opportunistic" techniques are described herein, and are intended broadly to include techniques for dynamically optimizing infrastructure resources based on present usage of those resources, for example, using opportunistic time shifting and/or opportunistic delay shifting techniques. Further, various embodiments are described with reference to a "requesting" or "non-requesting" subscriber, or the like. These types of designations are intended only to suggest a particular user's role for a particular transaction. The same user can be a non-requesting user in one transaction and the requesting user in a different transaction (e.g., at the same or different times). Even further, though only a single requester is shown for the sake of simplicity, a single transaction can involve multiple requesters, and/or multiple transactions can be processed concurrently such that the network includes many concurrent requesting and non-requesting users. In many transactions, the non-requesting users can become "opportunists," in that they can opportunistically receive multicast content in response to another user's requests. For example, when a subscriber requests content, the content can end up being multicast to the requesting subscriber and one or more non-requesting, opportunist subscribers. As used herein, content objects can generally be classified as "delayable" when it is determined that their delivery can be opportunistically or otherwise delayed (e.g., the content is not of a real-time category, the subscriber does not necessarily have a real-time need for the content, etc.). Though classified as delayable, delivery of such content objects is not necessarily delayed. For example, in some instances (e.g., due to certain available capacity, queue priority, fairness, etc.), a delayable object can be queued for substantially real-time (not delayed) delivery.

The various operations of methods and functions of certain system components described above can be performed by any suitable means capable of performing the corresponding functions. These means, including embodiments of subscriber system 110 and/or provider system 140 components, can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A provider-side system in a communications infrastructure, the system comprising:
   a communications processor that operates to receive a plurality of content requests from a plurality of requesting subscriber-side systems, each content request for delivery of a respective content object to a respective one of the requesting subscriber-side systems over the communications infrastructure;
   a queue having a plurality of previously requested content objects in a priority order arranged at least according to first and second queue regions, the first queue region scheduled according to presently available capacity of the communications infrastructure, and the second queue region scheduled according to predicted future capacity of the communication s infrastructure; and
   a queue processor that operates, for each content request, to:
      determine whether the delay delivery of the respective content object to the respective requesting subscriber-side system over the communications infrastructure; and
      queue the requested content object at a queue depth of the queue in response to determining whether to delay delivery, the queue depth being in the first queue region when it is determined not to delay delivery of the content object, and the queue depth being in the second queue region when it is determined to delay delivery of the content object.

2. The provider-side system of claim 1, wherein at least one of the plurality of content requests is received at the provider-side system from the respective one of the plurality of subscriber-side systems over the communications infrastructure.

3. The provider-side system of claim 1, wherein, the queue processor operates, for each content request, to determine whether to delay delivery of the content object by determining whether sufficient capacity is presently available to fulfill the content request over the communications infrastructure.

4. The provider-side system of claim 1, wherein, for at least one of the content objects:
   the communications processor operates to receive an explicit indication from the respective requesting subscriber-side system of whether to delay delivery of the content object; and
   the queue processor operates to determine whether to delay delivery of the content object in accordance with the received explicit indication.

5. The provider-side system of claim 1, wherein, for at least some of the content objects:
   the queue processor operates to determine by computing a respective promise time for each of the at least some of the content objects; and
   the queue processor operates to queue according to a priority order that corresponds to the respective promise times.

6. The provider-side system of claim 1, wherein the communications processor further operates to communicate each content object to the respective requesting subscriber terminal in accordance with its queue depth.

7. The provider-side system of claim 1, wherein the queue processor further operates, for each content request, to compute a promise time for the respective content object according to the queue depth of the respective content object.

8. The provider-side system of claim 1, wherein, for each of at least some of the content objects in the second region of the queue:
   the queue processor further operates to compute a promise time for the content object according to the queue depth of the content object; and
   the communications processor further operates to communicate the content object to the respective requesting subscriber terminal prior to the computed promise time for the content object.

9. The provider-side system of claim 1, wherein:
   the first queue region is sized according to a present opportunistic capacity of a communications link of the communications infrastructure, such that content objects queued in the first queue region are deliverable using the present opportunistic capacity of the communications link.

10. The provider-side system of claim 1, wherein:
    the first queue region is sized according to an available portion of a dedicated capacity of a communications link of the communications infrastructure, such that content objects queued in the first queue region are deliverable using the available portion of the dedicated capacity.

11. The provider-side system of claim 1, wherein, when it is determined to delay delivery of any of the respective content objects:
    the communications processor further operates to communicate an indication of delayed delivery to the respective requesting subscriber-side terminal in response determining to delay delivery of the respective content object.

12. A method comprising:
    receiving a plurality of content requests at a provider-side system, each content request for delivery of a respective content object to a respective one of a plurality of subscriber-side systems over the communications infrastructure; and
    for each content object, when the content object is determined to be a delayable content object;
    determining whether to delay delivery of the content object to the respective subscriber-side system over the communications infrastructure;
    queuing the content object at a queue depth of a queue in response to the determining, the queue depth being in a first region of the queue when it is determined not to delay delivery of the content object, and the queue depth being in a second region of the queue when it is determined to delay delivery of the content object,
    the first region of the queue scheduled according to presently available capacity of the communications infrastructure, and
    the second region of the queue scheduled according to predicted future capacity of the communications infrastructure.

13. The method of claim 12, wherein at least one of the plurality of content requests is received at the provider-side system from the respective one of the plurality of subscriber-side systems over the communications infrastructure.

14. The method of claim 12, further comprising, for at least one of the content objects:
    determining, by the provider-side system, that the content object is a delayable content object.

15. The method of claim 12, wherein, for at least one of the content objects:
  determining whether to delay delivery of the content object comprises determining, by the provider-side system, whether sufficient capacity is presently available to fulfill the content request over the communications infrastructure.

16. The method of claim 12, wherein, for at least one of the content objects:
  the receiving further comprises receiving an explicit indication from the corresponding subscriber-side system of whether to delay delivery of the content object; and
  determining whether to delay delivery of the content object is in accordance with the received explicit indication.

17. The method of claim 12, wherein, for at least some of the content objects:
  the determining comprises computing a respective promise time for each content object; and
  the queuing comprises determining the queue depth for each content object, such that the plurality of content objects is queued in a priority order according to the respective promise times.

18. The method of claim 12, wherein, for at least one of the content objects:
  the second region of the queue is associated with a range of future promise times;
  the determining comprises computing a promise time for the content object and determining whether the promise time for the content object is within the range of future promise times; and
  the queuing comprises queuing the content object in the second region of the queue only when it is determined that the promise time for the content object is within the range of future promise times.

19. The method of claim 12, wherein:
  the second region of the queue is one of a plurality of second regions, each associated with a respective range of future promise times; and
  for at least one of the content objects:
  the determining comprises computing a promise time for the content object and identifying one of the second ranges for which the promise time for the content object is within the respective range of future promise times; and
  the queuing comprises queuing the content object in the identified one of the second regions of the queue in response to the determining.

20. The method of claim 12, further comprising:
  communicating each content object to the respective subscriber terminal in accordance with its queue depth.

21. The method of claim 12, further comprising, for at least one the content objects:
  computing a promise time for the content object according to the queue depth of the content object.

22. The method of claim 12, further comprising, for at least some of the content objects in the second region of the queue:
  computing a promise time for each content object according at least to its queue depth; and
  communicating each content object to the respective subscriber terminal prior to its computed promise time.

23. The method of claim 12, wherein:
  the first region of the queue is sized according to a present opportunistic capacity of a communications link of the communications infrastructure, such that content objects queued in the first region are deliverable using the present opportunistic capacity of the communications link.

24. The method of claim 12, wherein:
  the first region of the queue is sized according to an available portion of a dedicated capacity of a communications link of the communications infrastructure, such that content objects queued in the first region are deliverable using the available portion of the dedicated capacity.

25. The method of claim 12, further comprising, for at least one content object, when it is determined to delay delivery of the content object:
  communicating an indication of delayed delivery to the respective subscriber-side terminal in response determining to delay delivery of the content object.

* * * * *